United States Patent
Laaksonen et al.

(10) Patent No.: US 12,309,575 B2
(45) Date of Patent: *May 20, 2025

(54) MULTI-VIEWPOINT MULTI-USER AUDIO USER EXPERIENCE

(71) Applicant: Nokia Technologies Oy, Espoo (FI)

(72) Inventors: Lasse Laaksonen, Tampere (FI); Sujeet Shyamsundar Mate, Tampere (FI); Kari Jarvinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,099

(22) Filed: Nov. 17, 2022

(65) Prior Publication Data

US 2023/0079893 A1    Mar. 16, 2023

Related U.S. Application Data

(63) Continuation of application No. 17/258,803, filed as application No. PCT/FI2019/050523 on Jul. 3, 2019, now Pat. No. 11,558,708.

(Continued)

(51) Int. Cl.
| | |
|---|---|
| *H04S 7/00* | (2006.01) |
| *H04N 21/218* | (2011.01) |
| *H04N 21/233* | (2011.01) |
| *H04N 21/242* | (2011.01) |
| *H04N 21/422* | (2011.01) |

(Continued)

(52) U.S. Cl.
CPC ....... *H04S 7/303* (2013.01); *H04N 21/21805* (2013.01); *H04N 21/233* (2013.01); *H04N 21/43074* (2020.08); *H04N 21/6587* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| 5,993,318 A | 11/1999 | Kousaki ..................... 463/35 |
| 2003/0005439 A1 | 1/2003 | Rovira |

(Continued)

FOREIGN PATENT DOCUMENTS

| CN | 1338690 A | 3/2002 |
| CN | 101014123 A | 8/2007 |

(Continued)

OTHER PUBLICATIONS

Koenen, Rob et al., editor, "Requirements MPEG-1 phase 1b" ISO/IEC JTC1/SC29/WG11, N17331, Jan. 2018, 8 pages.

*Primary Examiner* — Qin Zhu
(74) *Attorney, Agent, or Firm* — McCarter & English, LLP

(57) ABSTRACT

An apparatus configured to: receive a spatial media file comprising a plurality of viewpoints; determine a viewpoint from the plurality of viewpoints for a user consuming the spatial media file; receive an audio stream associated with the viewpoint; receive an augmentation audio stream, wherein the augmentation audio stream is at least partially different from the audio stream; control an audio rendering of the audio stream based, at least partially, on metadata associated with the augmentation audio stream; and provide the audio rendering of the audio stream for mixing with a rendering of the augmentation audio stream.

18 Claims, 7 Drawing Sheets

Related U.S. Application Data

(60) Provisional application No. 62/697,517, filed on Jul. 13, 2018.

(51) Int. Cl.
*H04N 21/43* (2011.01)
*H04N 21/4728* (2011.01)
*H04N 21/6587* (2011.01)
*H04N 21/81* (2011.01)

(56) References Cited

U.S. PATENT DOCUMENTS

| | | | |
|---|---|---|---|
| 2008/0144794 A1 | 6/2008 | Gardner | 379/202.01 |
| 2014/0328505 A1 | 11/2014 | Heinemann et al. | 381/303 |
| 2015/0289032 A1* | 10/2015 | Vermolen | H04N 21/41407 725/74 |
| 2016/0062730 A1 | 3/2016 | Kwon | |
| 2016/0381398 A1 | 12/2016 | Saxena et al. | |
| 2018/0071631 A1 | 3/2018 | Zoloto et al. | 13/54 |
| 2018/0098173 A1 | 4/2018 | Van Brandenburg et al. | 7/303 |
| 2018/0109901 A1 | 4/2018 | Laaksonen | |
| 2018/0124543 A1 | 5/2018 | Leppanen | |
| 2019/0149886 A1 | 5/2019 | Eronen | 725/86 |
| 2020/0278828 A1* | 9/2020 | Murtaza | G06F 3/165 |
| 2021/0125414 A1 | 4/2021 | Berkebile | |
| 2021/0243418 A1* | 8/2021 | Ojala | H04N 13/366 |

FOREIGN PATENT DOCUMENTS

| | | |
|---|---|---|
| CN | 104604256 A | 5/2015 |
| EP | 3112985 A1 | 1/2017 |
| EP | 3301952 A1 | 4/2018 |
| EP | 3534596 A1 | 9/2019 |
| EP | 3264783 B1 | 1/2021 |
| WO | WO-2017/202899 A1 | 11/2017 |
| WO | WO-2020068284 A1 | 4/2020 |

* cited by examiner

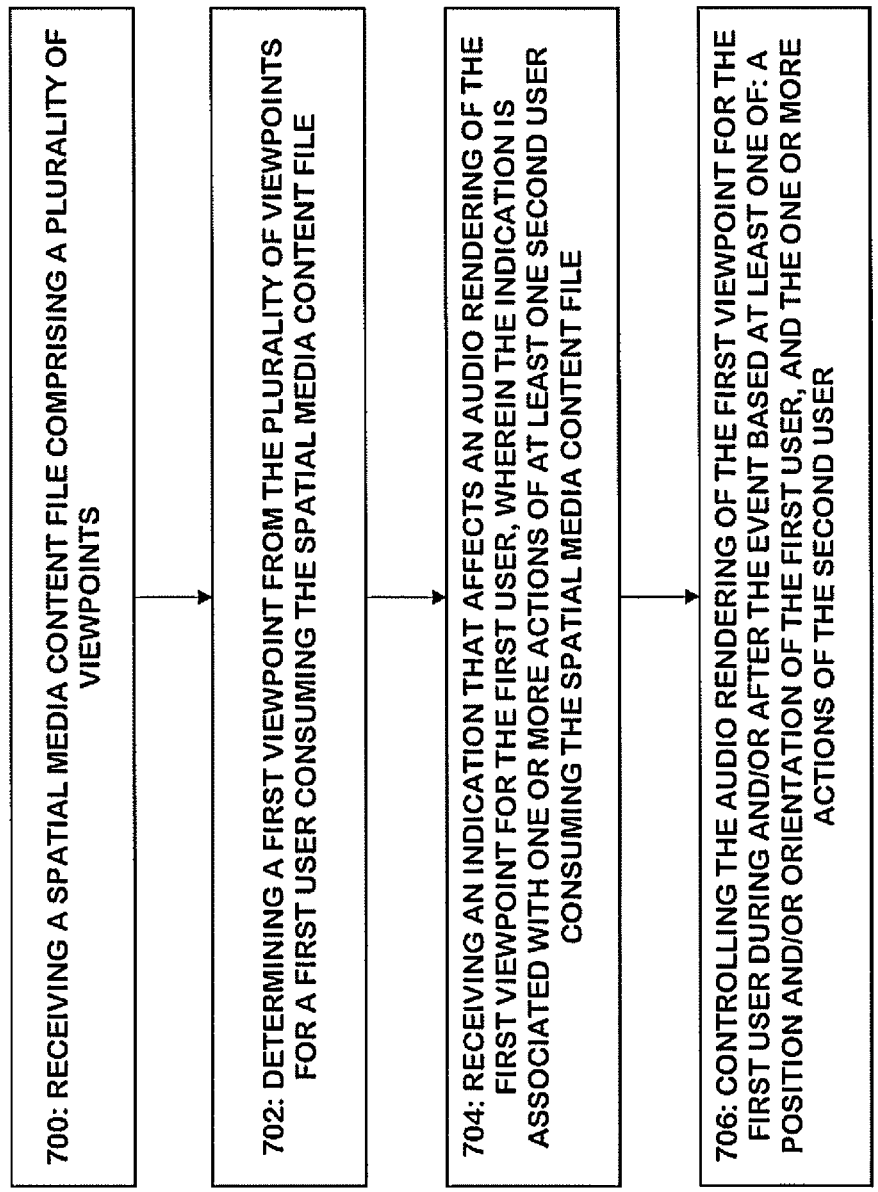

MULTI-VIEWPOINT MULTI-USER AUDIO USER EXPERIENCE

RELATED APPLICATION

This application is a continuation of U.S. patent application Ser. No. 17/258,803, filed Jan. 8, 2021, which is a National Stage Entry of International Application No. PCT/FI2019/050523, filed Jul. 3, 2019, which is hereby incorporated by reference in its entirety, and claims priority to US provisional application 62/697,517 filed Jul. 13, 2018, which is hereby incorporated by reference in its entirety.

TECHNICAL FIELD

Various example embodiments relate generally to audio rendering and, more specifically, relate to immersive audio content signaling and rendering.

BACKGROUND

Immersive audio and/or visual content generally allows a user to experience the content in a manner consistent with the user's orientation and/or location. For example, immersive audio content may allow a user to experience audio in a manner consistent with the user's rotational movement (e.g. pitch, yaw, and roll). This type of immersive audio is generally referred to as 3DoF (three degrees of freedom) content. Immersive content with full degree of freedom for roll, pitch and yaw, but limited freedom for translation movements is generally referred to as 3DoF+. Free-viewpoint audio (which may also be referred to as 6DoF) generally allows for a user to move around in an audio (or generally, audio-visual or mediated reality) space and experience the audio space in a manner that correctly corresponds to his location and orientation in it Immersive audio and visual content generally have properties such as a position and/or alignment in the mediated content environment to allow this.

The Moving Picture Experts Group (MPEG) is currently standardizing immersive media technologies under the name MPEG-I, which includes methods for various virtual reality (VR), augmented reality (AR) and/or mixed reality (MR) use cases. Additionally, the 3rd Generation Partnership Project (3GPP) is studying immersive audio-visual services for standardization, such as for multi-viewpoint streaming of VR (e.g., 3DoF) content delivery.

BRIEF DESCRIPTION OF THE DRAWINGS

Some example embodiments will now be described with reference to the accompanying drawings.

FIG. 7 is a logic flow diagram in accordance with various example embodiments, and illustrates the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION

Figure 1:
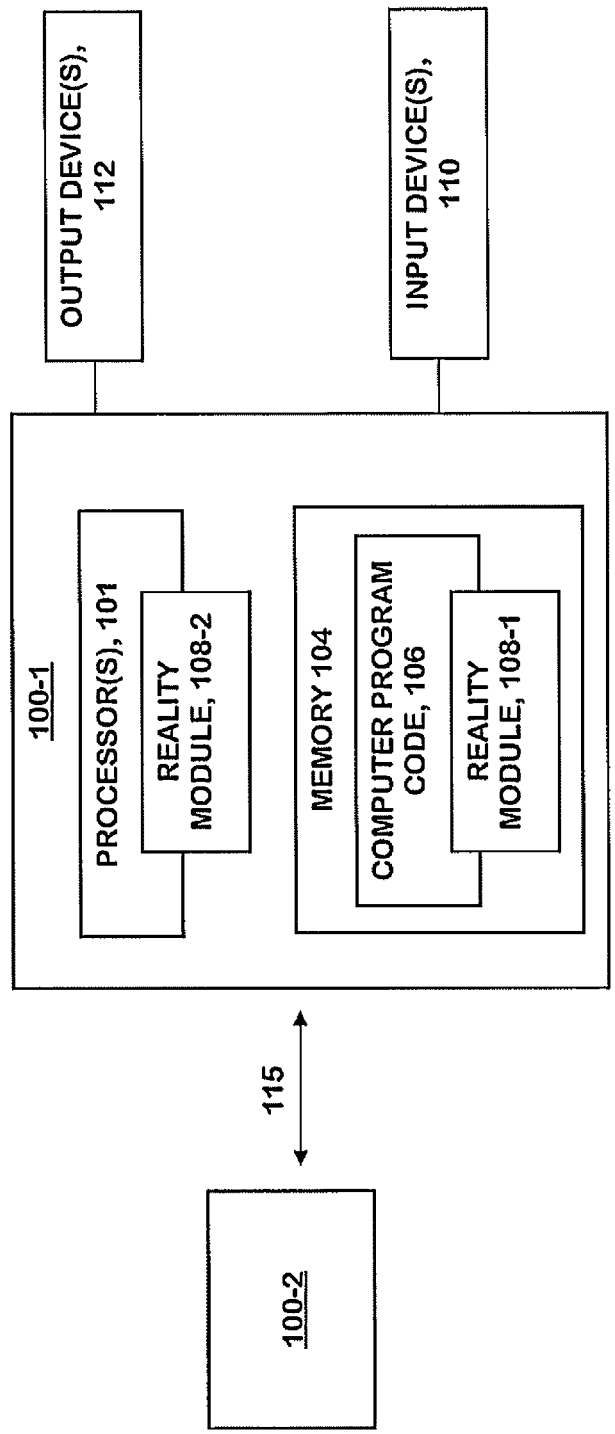
FIG. 1 is a block diagram of one possible and non-limiting exemplary apparatus in which various example embodiments may be practiced.

The following abbreviations that may be found in the specification and/or the drawing figures are defined as follows:

3DoF 3 degrees of freedom (head rotation)
3DoF+ 3DoF with additional limited translational movements (e.g. head movements)
6DoF 6 degrees of freedom (bead rotation and translational movements)
3GPP 3rd Generation Partnership Project
AR Augmented Reality
DAW Digital Audio Workstation
DisEv Disruption Event
DisEvR Disruption Event Response
MPEG Moving Picture Experts Group
MR Mixed Reality
VR Virtual Reality Various exemplary embodiments herein describe techniques for controlling audio in multi-viewpoint omnidirectional content. Additional description of these techniques is presented after a system into which the exemplary embodiments may be used is described.

In FIG. 1, an apparatus 100-1 is shown that includes one or more processors 101, one or more memories 104 interconnected through one or more buses 112. The one or more buses 112 may be address, data, or control buses, and may include any interconnection mechanism, such as a series of lines on a motherboard or integrated circuit, fiber optics or other optical communication equipment, and the like. The one or more memories 104 include computer program code 106. The apparatus 100-1 may include a reality module, comprising one of or both parts 108-1 and/or 108-2, which may be implemented in a number of ways. The reality module may be implemented in hardware as reality module 108-2, such as being implemented as part of the one or more processors 101. The reality module 108-2 may be implemented also as an integrated circuit or through other hardware such as a programmable gate array. In another example, the reality module may be implemented as reality module 108-2, which is implemented as computer program code 106 and is executed by the one or more processors 101. For instance, the one or more memories 104 and the computer program code 106 may be configured to, with the one or more processors 101, cause the apparatus 100-1 to perform one or more of the operations as described herein.

The one or more computer readable memories 104 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 104 may be means for performing storage functions. The processor(s) 101 may be of any type suitable to the local technical environment, and may include one or more of general purpose computers, special purpose computers, microprocessors, digital signal processors (DSPs) and processors based on a multi-core processor architecture, as non-limiting examples. The processor(s) 101 may be means for performing functions, such as controlling the apparatus 100-1 and other functions as described herein.

In some embodiments, the apparatus 100-1 may include one or more input(s) 110 and/or output(s) 112. The input(s) 110 may comprise any commonly known device for providing user input to a computer system such as a mouse, a keyboard, a touch pad, a camera, a touch screen, and/or a transducer. The input(s) 110 may also include any other suitable device for inputting information into the apparatus 100-1, such as another device.

In some embodiments, the apparatus 100-1 may include one or more input(s) 110 and/or output(s) 112. The input(s) 110 may comprise any commonly known device for providing user input to a computer system such as a mouse, a keyboard, a touch pad, a camera, a touch screen, and/or a transducer. The input(s) 110 may also include any other suitable device for inputting information into the apparatus 100-1, such as a GPS receiver, a sensor, and/or other computing devices for example. The sensor may be a gyro-sensor, pressure sensor, geomagnetic sensor, light sensor, barometer, hall sensor, and/or the like. The output(s) 112 may comprise, for example, one or more commonly known displays (such as a projector display, a near-eye display, a VR headset display, and/or the like), speakers, and a communications output to communicate information to another device. As shown in FIG. 1, the other device may be apparatus 100-2 which may be implemented similarly as shown for apparatus 100-1.

The inputs 110/outputs 112, may include a receiver and/or a transmitter for wired and/or wireless communications (such as WiFi, BLUETOOTH, cellular, NFC, Ethernet and/or the like), which may be used for communication between apparatuses 100-1 and 100-2 for example. In some embodiments, each of the input(s) 110 and/or output(s) 112 may be integrally, physically, or wirelessly connected to the apparatus 100-1.

In general, the various embodiments of the apparatus 100-1 can include, but are not limited to cellular telephones such as smart phones, tablets, personal digital assistants (PDAs), computers such as desktop and portable computers, gaming devices, VR headsets/goggles/glasses, music storage and playback appliances, tablets, as well as portable units or terminals that incorporate combinations of such functions.

In some example embodiments the apparatus 100-1 may correspond to system for creating immersive media content via content creations tools, a system for rendering immersive media content, and/or a system for delivering immersive media content to another device as is described in more detail below.

Having thus introduced one suitable but non-limiting technical context for the practice of the various exemplary embodiments, the exemplary embodiments will now be described with greater specificity.

As described in more detail below, some aspects described herein can be implemented in various parts of the content creation-content delivery-content consumption process. For example, some aspects are aimed at improving tools for audio software for AR/MR/VR content creation (such as tools for defining flags, rules, etc. that are delivered alongside the audio waveform content as metadata). The content creation tools may include, but are not limited to, software (such as for a digital audio workstation) or a plugin that enables audio authoring for multi-viewpoint media content.

Some aspects relate to media file format and metadata descriptions for applicable standards, such as MPEG-I standard. For example, metadata may define when a local user audio rendering is modified due to a Disruption Event and how said modification is done (Disruption Event Response).

Some aspects relate to an audio content rendering engine in an AR/MR/VR device or application such as an AR headphone device, a mobile client, or an audio renderer. The audio renderer may be an audio renderer that is compliant with a relevant standard (such as MPEG-I for example). These aspects may include, for example, reading of metadata, selection of audio streams and modification of rendering based on the metadata. The audio content rendering engine may be implemented on a device and/or software product on a device, e.g., a mobile device for AR content consumption or a VR content consumption device.

As such, various example embodiments strengthen multi-user audio experience support and improve the content creator's control over the immersive AR/MR/VR experiences by allowing the audio rendering to be more consistent (such as with respect to the story line of the content for example) while enabling more freedom for the end user (such as increased personalization of the content consumption experience for example).

Various example embodiments relate to rendering of immersive audio media (in either audio-only or audio-visual context) and signaling related to controlling this rendering. Various features as described herein may be defined by a relevant standard, such as MPEG-I audio (phase 1a, 1b or 2) specifications and/or 3GPP specification.

For case of understanding, the description herein occasionally uses background music as an example audio, however, various example embodiments described herein apply equally to any other audio types.

The term 'audio space' is generally used herein to refer to a three-dimensional space defined by a media content file having at least two different listening points such that a user may switch and/or move between the different listening points. The switching may relate to space, time, or some other contextual aspect (such as a story element or a rule set defined by a content creator for example). Thus, it should be understood that a user may be able to move and/or switch between the at least two listening points in the audio space via user input, a service or content dependent aspect may trigger switching between the at last two different listening points, and/or the switching may relate to any other contextual aspect (such as a story element, a rule set by a content creator, and/or the like).

'Spatial audio' generally refers to audio where sound is perceived by a user with appropriate directional and ambient properties.

As used herein, a user who 'consumes' media content may include listening to the media content, watching the media content, interacting with media content, and/or the like.

The term 'viewpoint' is generally used herein to describe a visual viewpoint and/or audio viewpoint within multi-viewpoint content (such as 3DoF, 3DoF+, or 6DoF content). As a non-limiting example, a viewpoint may be a listening point of a 3DOF content, where the full audio scene may comprise multiple discrete listening points. As another non-limiting example, a viewpoint may correspond to 3DOF+ content where there is limited translation possibility in the vicinity of the listening point described above for 3DOF content.

Non-limiting examples of an 'audio object' are an audio source with a spatial position, a channel-based bed, scene-based audio represented as a First-Order Ambisonic/Higher-Order Ambisonic (FOA/HOA), a metadata-assisted spatial audio (MASA) representation of a captured audio scene, or any audio that has metadata associated with it in the context of the media content being experienced by the user.

In a 3D space, there are in total six degrees of freedom (DoF) that define the way a user may move within said space. This movement is generally divided into two categories: rotational and translational movement, each of which includes three degrees of freedom. Rotational movement is sufficient for a simple VR experience where the user may turn her head (pitch, yaw, and roll) to experience the space from a static point or along an automatically moving trajectory. Translational movement means that the user may also change the position of the rendering, namely, the user may move along the x, y and z axes according to their wishes. Free-viewpoint AR/VR experiences allow for both rotational and translational movements. It is common to talk about the various degrees of freedom and the related experiences using the terms 3DoF, 3DoF+ and 6DoF. 3DoF+ falls somewhat between 3DoF and 6DoF. It allows for some limited user movement, for example, it can be considered to implement a restricted 6DoF where the user is sitting down but can lean their head in various directions with content rendering being impacted accordingly.

Audio and visual content generally have properties such as a position and alignment in the mediated content environment. This information allows the content to be rendered relative to the position and rotation of the user such that the user will experience the content as if being there. In addition to diegetic audio content (that takes the user's position/rotation into account in rendering), it is common to use also non-diegetic audio that remains fixed regardless of at least the user's head rotation. Such audio content may have directions etc. but those directions are fixed relative to the user. Such content rendering is useful, e.g., for background music, narrator's commentary, some types of dialogue, etc. In some embodiments, a non-diegetic audio can however be, e.g., reproduced only in a certain region of a 6DoF content for example such that user movement beyond a certain (viewpoint) area may begin to attenuate the non-diegetic audio until its level reaches zero.

The technical implementation of multi-viewpoint media content is typically such that a media file includes multiple streams related to multiple "isolated yet related" viewpoints (or listening points) in a mediated content environment. For example, each viewpoint can be self-contained, yet interconnected via a metadata set, which may, e.g., be defined during content mastering or scripting (i.e., the content creation process where content creator control or artistic intent is applied).

Figure 2:
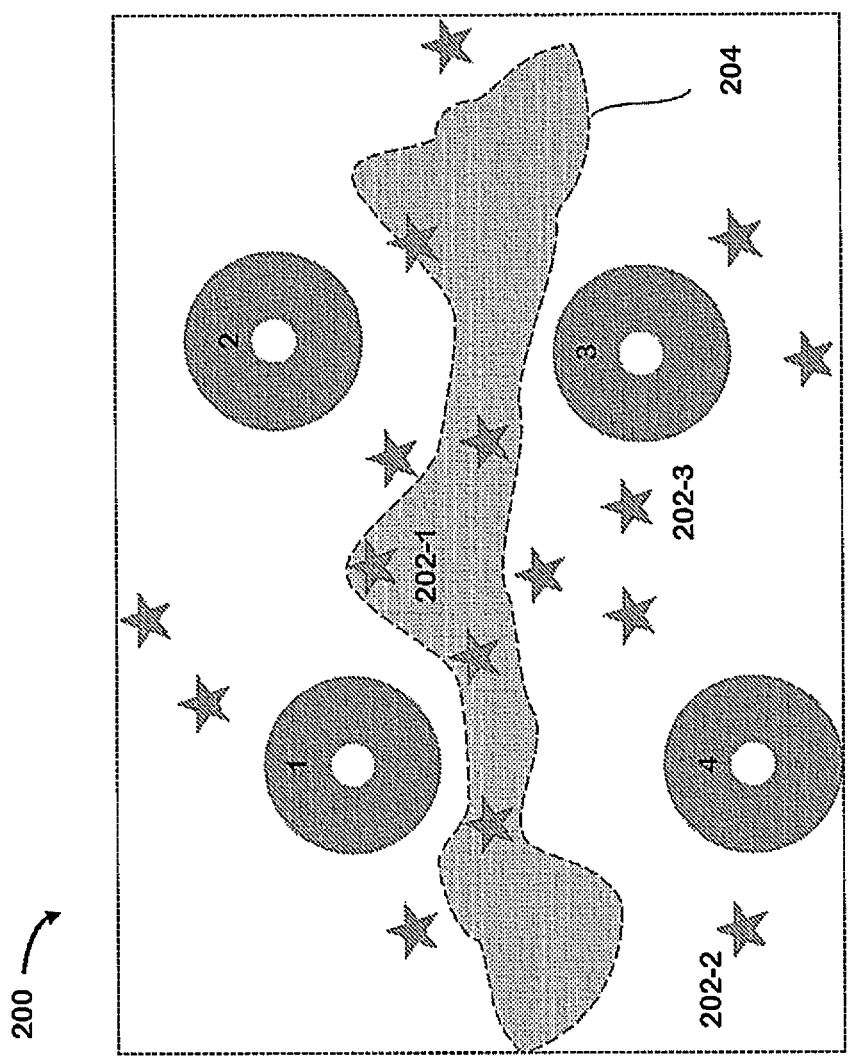
FIG. 2 represents a multi-viewpoint content space 200 of an audio-visual experience file in accordance with some example embodiments.

Referring now to FIG. 2, this figure represents a multi-viewpoint content space 200 of an audio-visual experience file in accordance with some example embodiments. In this example, the user has four possible listening/viewing points (which also may be referred to as listening/viewing areas) in the multi-viewpoint content file that are labeled 1-4. A user may first consume the content at a first viewpoint (and/or listening point), and then may 'move' or 'teleport' to other viewpoints without interrupting the overall experience. In FIG. 2, the central part of each donut-shaped viewing area corresponds to, for example, the 3DoF(+) sweet spot, and the darker area corresponds to the "roamable" area (3DoF+ or restricted 6DoF). The user may be free to choose the order and timing of any switch between these viewpoints or scenes (in case of restricted 6DoF). The dashed area 204 in the middle of FIG. 2 represents an 'obstacle' in the content. For example, the obstacle may be a wall, a mountain, and/or the like. Such obstacles can limit at least the line of sight, but potentially also the audibility of at least some audio content. In FIG. 2, different audio sources are represented as star symbols. At least some of the audio sources shown on top of the dashed area, such as audio source 202-1 for example, may be audible to all directions/viewpoints within the scene file, whereas other audio sources may be audible to a limited amount of viewpoints. For example, audio source 202-2 may be audible to only viewpoint 4, whereas audio source 202-3 may be audible to only viewpoints 3 and 4, for example.

In addition to "natural" boundaries (such as walls and mountains, for example), there may be other types of boundaries in the content, for example, a multi-viewpoint content file may include or consist of "virtual rooms" that limit, for example, at least the audibility of some audio content across their "virtual walls". It is also noted that viewpoints in a virtual content file may be very distant from each other and may even represent different points in time or, e.g., different "paths" of an interactive story. In further examples, viewpoints in a virtual content file may correspond to customer tier levels, where, e.g., a "platinum level" customer is offered richer or otherwise different content or parts of content than a "gold level" or "silver level" customer. On the other hand, switching between viewpoints in a virtual content file can happen at very different frequencies. For example, a user may wish to quickly view a specific scene from various available points of view around the scene and continuously switch back and forth between them, whereas in most services it may be unlikely, e.g., for a user to be upgraded in tier more than once during even a long content consumption.

Considering the above, it is generally beneficial to have different audio content (for example object-based audio) for each viewpoint in a media content file that may not be continuously "roamable" by the user across the whole content. For example, unrestricted 6DoF content may be considered continuously "roamable". It is noted that switching from a first viewpoint to a second viewpoint may in such case disrupt the audio rendering and presentation. Without some smoothing (such as a crossfade for example), such disruption can be extremely annoying to the user (as it may be heard as clicks and pops). Therefore, in any such application, at least some smoothing of the audio under switching is expected. However, there generally remains a disruption from the previous content to the current one.

In the context of non-diegetic audio content, for example, the switching behavior between viewpoints also needs be considered. For example, a content creator may desire a first piece of background music to continue even when a user switches to a new viewpoint, even if the new viewpoint is associated with a different piece of background music. For instance, it may be helpful for the first piece of background music to continue (with same or different sound level) until for some amount of time, until occurrence of a certain event in the music or the overall content, and/or the like. This may also be true for other types of non-diegetic audio such as a narrator's commentary or other types of diegetic dialogue or other diegetic audio for example.

In some circumstances, different viewpoints may feature different pieces of background music. Typically these cases are not handled in the way the content creator intended and can become very distracting for the user when switching between viewpoints even if some type of smoothing is applied. For example, when a user switches between a first viewpoint to a second viewpoint this can cause a switch from a first piece of background music to a second piece of background music even when the first background music should ideally be maintained during these switches under some (potentially content-creator specified) circumstances. Moreover, a user switching back and forth between at least two viewpoints may be annoyed by, e.g., a background music that keeps changing.

Figure 3:
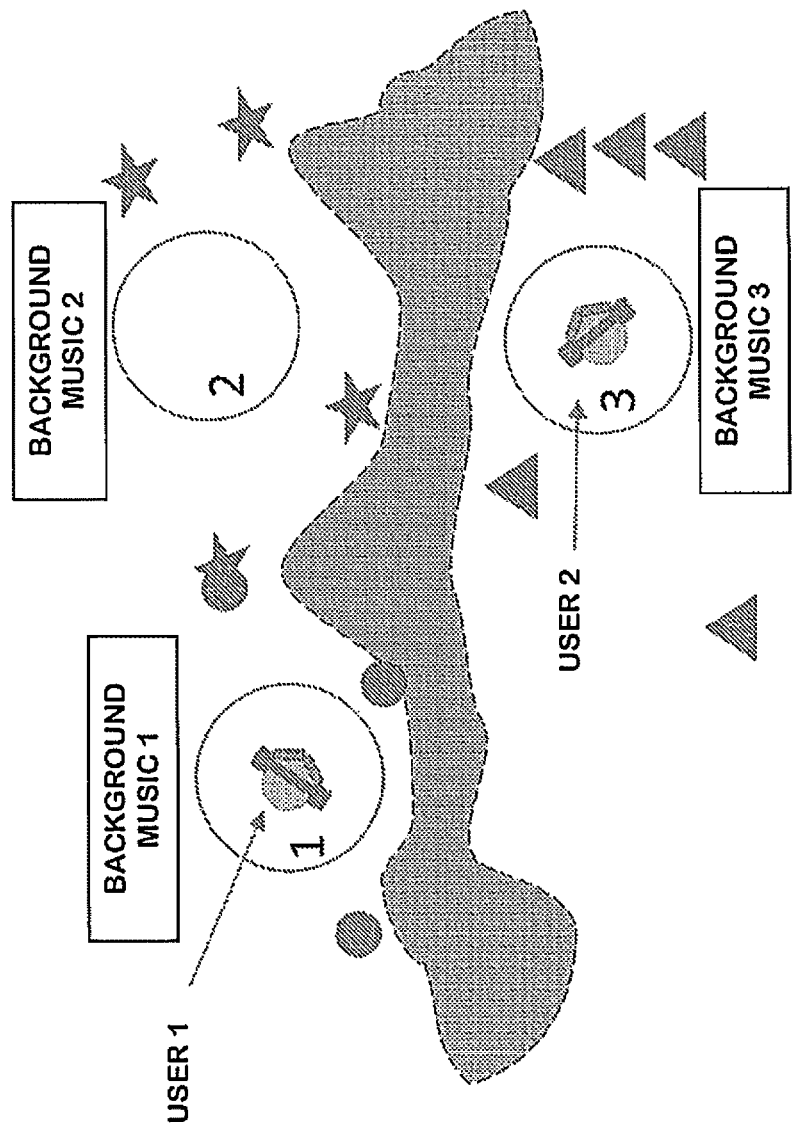
FIG. 3 shows an example of multi-user content consumption of a multi-viewpoint content file.

Referring also to FIG. 3, this figure shows an example of multi-user content consumption of a multi-viewpoint content file. In this example the content file has three possible listening/viewing points (which also may be referred to as listening/viewing areas) that are labeled 1-3. Each of the listening/viewpoints 1, 2, 3 are associated with different audio sources at different locations, which are represented by the circles, stars, and triangles, respectively. Further, each viewpoint features a separate background music (namely, background music 1-3). Background music 1-3 may relate to, for example, aspects and artistic intent of the respective viewpoints. Two users, namely, user 1 and user 2, are 'located' at the listening/viewing points 1 and 3, respectively. In examples such as shown in FIG. 2, the continuity of the multi-viewpoint audio experience is typically not preserved when users switch between viewpoints. Related to this issue, the content authoring tools for such formats do not offer suitable content creator control over the randomness of the user behavior.

When considering multi-user use cases, it should be possible to treat each instance as a separate single-user use case and this way arrive at somewhat improved user experience. However, this approach fails to address the interactions of the at least two users between each other and/or the media content. Such interactions can be of significant importance for continuity of the experience, particularly when the users are able to communicate with each other and thus share, e.g., their views or thoughts on the content experience and its details with each other. The content creator should have control over the rendering behavior in such cases so that the at least two users share a similar experience.

In multi-user use cases the users may change their viewpoints independently from each other. This means that the users sharing a certain viewpoint do not necessarily share the same history of viewpoints. For example, the previous viewpoint from where one user entered the current viewpoint may be different from another user. As such, in multi-user cases, the users may hear different audio while sharing the same viewpoint (due to continuity of their personal experience) which may lead to potentially confusing or annoying user experience because users at the same viewpoint expect that the audio they hear is the same or at least very similar. For example:

1. Users sharing the same viewpoint but hearing different audio may communicate with each other via a communication audio channel and, if during the communication they hear background music/audio from the others which is notably different from theirs, they may get confused.
2. Users sharing the same viewpoint but hearing different audio may communicate with each other via communication audio channel (or by using other means of social interaction) and, if one of the users refers to audio he hears but which is at least significantly absent from the other users' content, the other users will get confused.
3. Users sharing the same viewpoint but hearing different audio may act differently because of the different audio (e.g., loud background music from previous viewpoint masking some of the audio inherent to the current viewpoint that gives guidance about what to do at the current viewpoint). Again, the users will get confused if the actions of the other users are visible (or otherwise observable) to them and do not appear consistent with their personal experience.
4. Users sharing the same viewpoint but hearing different audio may recall their experience differently. This may create inconsistency as well as confusion if the experience is discussed or relived after the consumption session.

For interaction between the users, the audio in a viewpoint shared by several users should be made relevant for the common experience and should not stay completely independent from each other. Otherwise the users sharing the same viewpoint (and interacting with each other) will get confused or annoyed as noted in the above examples. Various example embodiments provide control over the balance between enabling common experience at a shared viewpoint and providing a personalized experience with continuity from earlier visited viewpoints.

Various features as described herein are relevant to situations in which multiple users switch between viewpoints of a multi-viewpoint content file in a common interactive content consumption. In such situations, disruption events can be created for each of the users, where: a second user's switching modifies the second user's audio rendering in the new/current viewpoint based on at least one rule related to past content consumption by the second user, and a first user is made aware of the said modification of the second user's audio rendering (as this is common interactive content consumption and it can be assumed such change can be relevant for the first user). The various example embodiments described herein provide suitable and efficient control of how audio is rendered and presented to a user when such disruption events take place. It is noted that a disruption event may be observed also for other actions besides viewpoint switching depending on the degree of interactivity of the content. For example, a disruption event may be observed within the same viewpoint if the disruption event has triggered a sound which is considered to be part of the common audio scene and therefore audible to the second user. In case of 6DoF free movement capable content, disruption events may occur as part of the usual content consumption.

In some examples, the at least one sound triggered by the disruption event may be a sound from, or associated with, at least one of the users or user devices. It may be a sound that is part of the 6DoF scene or one that becomes part of it, e.g., via augmentation. It is further understood the user devices are typically mobile devices including but not limited to head-mounted display (HMD) devices, AR visors or glasses, VR helmets, headphones (typically implementing head tracking), or mobile phones.

In some examples, signaling may be provided that allows a "persistent audio rendering" of at least one audio based on metadata when a user switches from a first listening and/or viewpoint to a second listening and/or viewpoint. Particularly, the audio need not be by default intended for, available, or audible at the second listening/viewpoint. However, based on the signaling, the playback of the said audio can nevertheless continue at the second listening and/or viewpoint. As an example, when a user switches or jumps from a first listening point to a second listening point, where both listening points include a background music item, then instead of using the background music item of the second listening and/or viewpoint after the switch/jump, the playback of the first background music item may be maintained at least in part.

Some features also go beyond persisting playback of audio from a previous viewpoint when switching to the current viewpoint, and enable a content creator to modify the current viewpoint audio scene based on one or more past actions, such as interactions between different users and/or the content. This improves, e.g., the common content consumption of multi-viewpoint content including audio modification due to viewpoint switching by at least one user. For example, a change in a story line of a multi-viewpoint content based on an action of a second user may be signaled in order to modify the related audio rendering of the first user. In this example, the first and second users consume the same content independently yet in a way that allows for improved social interaction.

According to one example embodiment, techniques are provided for signaling the desired change in an audio rendering for a first user depending on the change in a second user's viewpoint where the at least two users commonly consume interactive multi-viewpoint 3DoF/3DoF+/6DoF content. The change in the audio rendering for the current viewpoint may include one or more of the following: an addition of at least an audio; replacement of at least an audio; modification of at least an audio; and an augmentation of one or more audio.

In various examples, the change in the audio rendering for the current viewpoint may be time-varying (for example, it may have a duration that may be signaled separately) and/or space-varying (for example, at least the position (or rotation) of a first user may affect the change in a way that be signaled separately).

In general, the techniques are furthermore applicable for non-switching cases and/or single-user cases based on Disruption Events ('DisEv') for audio and a Disruption Event Responses ('DisEvR') for audio. The terms 'Disruption Event' and 'Disruption Event Response' for multi-viewpoint content (e.g. audio and/or media files) may be defined as follows:

Disruption Event (DisEv): An audio environment at user's viewpoint is affected by introduction of at least one of:
  an audio part of at least one other viewpoint, and
  an audio rendering parameter part of at least one other viewpoint,
due to at least one of:
  at least one previous viewpoint;
  a metric or rule based on at least one previous viewpoint. (for example, background music track may be continued from a previous viewpoint to a current viewpoint, this may be different for another user who may arrive to current viewpoint from a third viewpoint which has a different background track persistence rule);
  a user action in a current viewpoint or at least in one previous viewpoint (for example, a first user mutes an alarm clock audible in previous viewpoint which is audible also in current viewpoint, if it was not muted. This discrepancy would be obvious for a second user who has not muted the alarm clock earlier); and
  user status (related, e.g., to past user action) in current viewpoint.

DisEv in multi-user case: With at least two users participating in a common interactive content consumption, a disruption event is defined for the following switching cases:
  an audio environment at a first user's viewpoint is affected based on a second user switching the viewpoint, and
  an audio environment of a second user switching the viewpoint is affected based on a status or an action of a first user;
and the following non-switching case, where:
  at least one of the at least two viewpoints can be a common viewpoint. For example, a first user in a first viewpoint within a virtual space may turn on a TV in a living room, and consequently a second user in a second viewpoint of the virtual space (e.g. a kitchen) is able to hear the TV audio in the second viewpoint.

Disruption Event Response ('DisEvR'): Rendering modification specified by the (metadata) signaling based on the observed DisEv. In other words, metadata related to a disruption event (DisEv) controls the rendering of an audio object including maintaining its rendering based on/during/after/due to the DisEv. In a multi-user use case, the audio object can be introduced to another user consuming a different viewpoint audio or alternatively a modification of at least one audio being already rendered to the user can be performed.

In some example embodiments, another indication (e.g., an audio indication such as a tone) may be used, and thus provide tools for the content creator to specify how a first user's past or current audio experience affects the audio rendering for a second user. This is particularly useful for multi-user use cases.

It is also noted that in some example embodiments, an event may occur due to an action by a user that causes a change to audio at another viewpoint for the user. For example, a user may press a button at viewpoint 1 which results in a toy train starting up near viewpoint 2. By default user 1 would not have heard the toy train whistle at viewpoint 2, but the audio rendering at viewpoint 2 has changed due to the button being pressed. In this case, the disruption event is the button press by user 1.

Some example embodiments extend the control of a 3DoF augmentation audio for a 6DoF content. An example of such use case is a 6DoF Audio Renderer with a Low-Delay Path for communications audio (such as a MPEG-I 6DoF Audio Renderer audio renderer for example). In these embodiments, the first audio (6DoF audio content) being modified due to properties related to a second audio (3DoF augmentation audio) is part of a different file/stream than the second audio. Also, the at least two users can consume different content. The interaction between the users can here be limited to the communications audio.

Metadata Implementation

Some example embodiments relate to the selection and rendering of transmitted audio streams (objects, items). In such examples, an audio stream may include both the audio waveform of one or more audio objects as well as metadata (or signaling). For example, the metadata may be transmitted alongside the (encoded) audio waveforms. The metadata may be used to render the audio objects in a manner consistent with the content creator's intent or service or application or content experience design.

For instance, metadata may be associated with a first audio object (such as a first audio object at a first listening point for example) such that the metadata describes how to handle that first audio object when switching to a second listening point or how to handle an audio object based on/during/after/due to DisEv. Metadata can be associated with a first audio object and at least a second audio object (such as an audio object from the second listening point), in which case the metadata describes how to handle the first audio object and how this relates or effects how the at least one second audio object is handled. In this situation, the current/first audio object is part of the scene the user is switching from, and the at least one other audio object may be part of the scene the user switching to. It is also possible that the metadata could be associated with only the second audio object, in which case the system would 'look back' for the audio object rather than 'looking forward' as is the case in the implementations above.

In one example embodiment, metadata is provided for different 'perception zones' and is used to signal a change in the audio depending on change in the user's viewpoint when consuming, for example, 3DoF/3DoF+/6DoF media content. For example, multi-viewpoint in case of 6DoF may include switching across overlapping or non-overlapping perception zones (e.g., from room 1 to room 2), where each perception zone may be described as a ViewpointCollection which comprises of multiple ViewpointAudioItems. Depending on the viewpoint change situation, the content creator may specify if the ViewpointAudioItems should switch immediately or persist longer. This information may in some embodiments be determined by the switching device renderer or signaled as metadata in the stream. Thus, in some examples different sets of audio objects may be associated with different audio or perception 'zones', where switching between different listening points/viewpoints switches between the different audio zones. For example, a first set of audio objects may be associated with a first audio zone and a second set of audio objects may be associated with a second audio zone such that a switch between first and second listening points/viewpoints causes a switch between the first audio zone and the second audio zone.

In some cases, the first set of audio objects and the second set of audio objects may partially overlap (such as an audio object associated with the same audio waveform for example). The audio objects that overlap may each have a rendering property (such as an audio level for example) where the value of the rendering property may be similar or different. The value may be similar in the sense that the difference in the value of the rendering property would be generally imperceivable to the user when switching between the listening/viewing points. In such cases, an option can be sent to the renderer. In cases where the difference in the value of the rendering property would be perceivable, then signaling (e.g. metadata) can be provided that describes how to handle at least the rendering property of the overlapped audio objects during and/or after the switch between the different listening points. Examples where this may happen generally relate to specific pairs of viewpoints in a virtual content file including at least two, but typically many, viewpoints.

It should be understood that signaling (e.g. metadata) described herein may be associated with one or more individual properties of one or more audio objects, one or more audio objects, one or more listening points/viewpoints, and/or one or more audio zones, and thus allows significant flexibility and control of audio when switching between different listening points/viewpoints.

In some example embodiments, when playback of an audio object from a previous listening point/viewpoint is continued during and/or after a switch to a current listening point/viewpoint, then a renderer may treat that audio object as being part of the current viewpoint at least for an amount of time that the playback of the audio object is continued at the current viewpoint. For example, the audio object could be added to a list of audio objects of the second listening point while playback of the audio object is continued. In another example, signaling associated with the audio object from the previous viewpoint/listening point may indicate that playback of the audio object is to continue during and/or after one or more further switches if the audio object is still being played back at the current listening point. If another switch is made from the current listening point to a next viewpoint/listening point (which may include a switch back to the previous viewpoint/listening point) the audio object may be handled accordingly. In this way, embodiments allow an audio object from a first listening to be adaptively handled through multiple switches between multiple listening points/viewpoints.

Table 1 below describes metadata for a ViewpointCollection in accordance with an example embodiment. In this example, an object-based audio type representation of the audio scene is used, however, it is understood that other representations are also possible for audio objects.

TABLE 1

| Metadata key | Type | Description |
| --- | --- | --- |
| ViewpointCollection | List | Collection of media objects representing a multi-viewpoint scene and related information. |
| ViewpointAudioItem | Object | Audio object or element. Information on waveform, various metadata, etc. defining the object or element. |
| DisruptionEvent | List | A list of conditions when and how playback of audio object or element is modified in current viewpoint, and/or when and how playback of audio object or element is continued in a different viewpoint during and after a switching to a different viewpoint. This includes conditions for local and remote user audio playback. |
| DisruptionEventConnectedItem | List | Collection of zero or more audio objects or elements that are connected to the current audio object or element. |
| Disruption Event Parameters | List | Collection of one or more parameters pertaining to modification or continued playback of connected audio objects or elements relative to Disruption Events in multi-viewpoint audio. | provided to ignore signaling related to handling an audio object when switching between listening points. The indication may be set by the content creator, e.g., to reduce complexity or memory consumption. If such content being transmitted, then it is also possible that such signaling is not sent to the renderer.

The Disruption Event Parameters list above may include, for example, one or more of the following:
delayedSwitchPersist: A list of parameters for performing a delayed switching to the connected audio object or element during a switching with persistent playback.

switchDelayPersist: A Boolean parameter where the value of the parameter is set to indicate whether the persisted playback of an audio object or element of a previous viewpoint is switched to playback of the connected item after a given time (defined, e.g., by switchDelayPersistTime media time parameter).

switchDelayPersistTime: A time parameter where the value of the parameter is set to a media presentation start time relative to a switching time. This time defines when the playback (e.g., a crossfade) begins following a viewpoint switching. Alternatively, the playback begins at the latest when the persistent playback of an audio object or element ends, e.g., due to running out of audio waveform (similarly allowing, e.g., for a crossfade), whichever comes first.

switchAfterPersist: A Boolean parameter where the value of the parameter is set to indicate whether the persisted playback of an audio object or element of a previous viewpoint overrides the playback of the connected item until its persistent playback end. The playback of the connected audio object or element is permitted after this.

switchOffPersist: A Boolean parameter where the value of the parameter is set to indicate whether the persisted playback of an audio object or element of a previous viewpoint overrides the playback of the connected item.

In some examples, a disruption event response (e.g. a change in audio due to a disruption event) may persist according to the life-time or properties of the impacted audio elements. So, there could be disruption event where only the additional source or modified source of change in the audio scene is delivered to the impacted viewpoint.

It is noted that the metadata keys, types, and description above are merely examples and are not intended to be limiting. For example, some of the metadata described in Table 1 may be optional, different names of the metadata keys may be used, and/or the like.

Renderer Implementation

An audio content rendering engine typically corresponds to software that puts together the audio waveforms that are presented to the user. The presentation may be through headphones or using a loudspeaker setup. The audio content rendering engine may run, for example, on a general-purpose processor or dedicated hardware.

Figure 4:
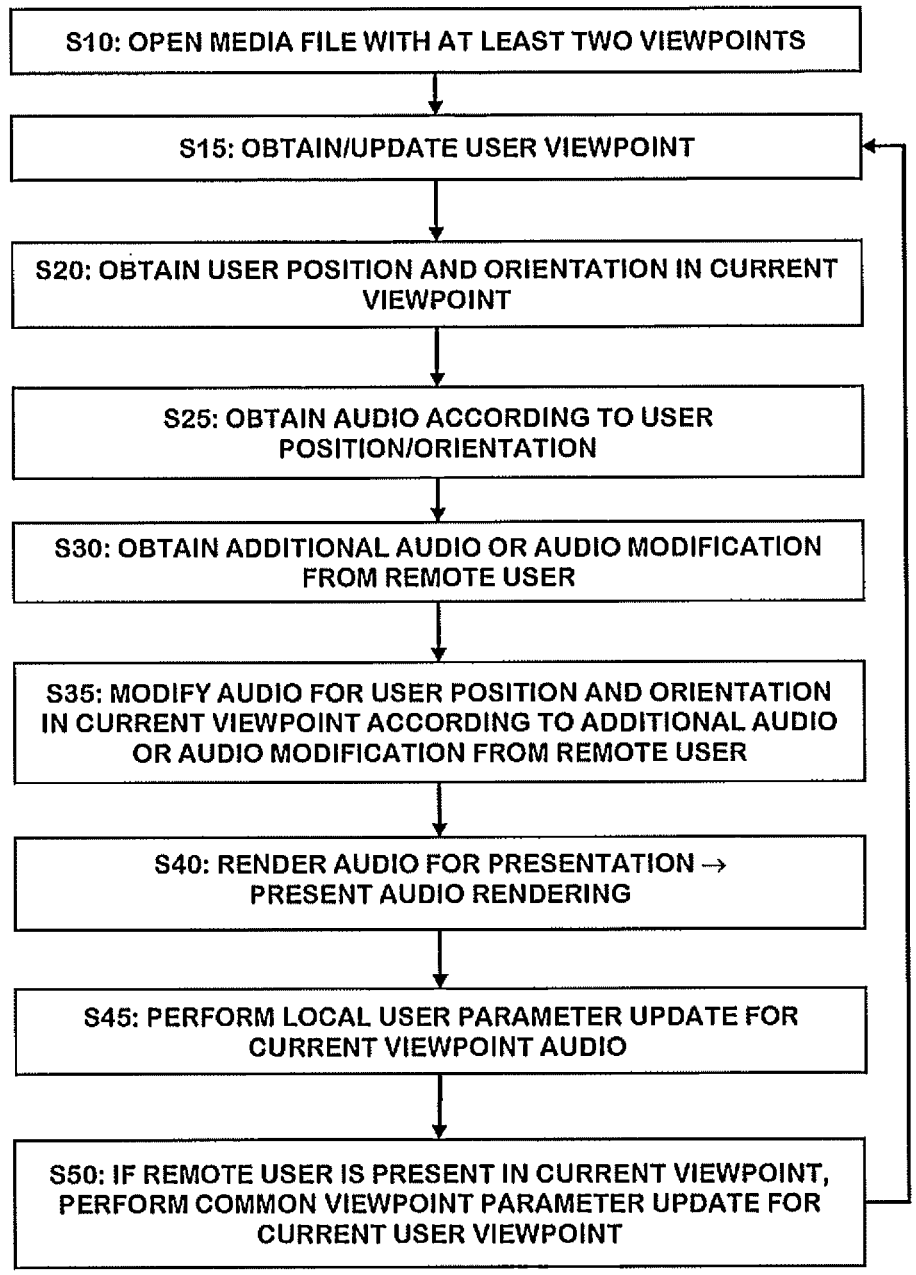
FIG. 4 is a high-level process flow diagram in accordance with some example embodiments.

Referring now to FIG. 4, this figure shows a high-level process flow diagram in accordance with an example embodiment. The process may be implemented in an audio content rendering engine of a local user for example.

At step S10, a user opens a media file where the media file includes at least two viewpoints. Steps S15-50 may be performed while the media file is open. At step S15, the current view point is obtained and the viewpoint information is updated. In some examples the viewpoint may be obtained based on a user input such as the user providing an input to select a starting viewpoint. Alternatively, the starting viewpoint may be predetermined such as being read from the media file or being given by an AR user tracking system. At step S20, the user position and orientation are obtained in the current viewpoint. At step S25, audio streams are obtained according to the determined user position and orientation in the current viewpoint. At step S30, additional audio streams and/or audio modification parameters are obtained from a remote user. At step S35, the audio streams obtained at S25 are modified for the user position and orientation in the current viewpoint according to the additional audio streams and/or audio modification parameters from the remote user. At S40, the modified audio streams are rendered and presented to the user. At step S45, local user parameters are updated for the current viewpoint audio. At S50, common viewpoint parameters are updated for the current user viewpoint if the remote user is present in the current viewpoint. The process flow then returns to step S15.

Although not included in FIG. 4, it should be understood that the local user's actions may similarly affect the remote user(s). Local user refers to the user running the current rendering instance. A remote user is any user connected with local user in a multi-user content consumption. For each user (local user), the other users are thus remote users. The connection to a remote user can be established in parallel with the content consumption. Thus, the connection need not be established when starting playback for the local user. For example, a user 2 can "join" a multi-user content consumption started by and ongoing for a user 1.

It is further noted that rendering the audio streams may be modified in a way that does not strictly follow the position and/or orientation of the user(s), but also uses additional information from metadata of an audio object (such as instructions based on the Disruption Event Parameters from Table 1 for example). As a non-limiting example of an interaction between a user and an audio object, a specific audio object may be rendered according to the user location/orientation in a 6DoF scene until the user reaches a limit of 1 meter of distance from the audio object, at which point said audio object becomes more and more non-diegetic and furthermore "sticks to" the user until the user "escapes" to at least 5-meter distance of the default audio object location. User interaction may also relate to very direct interaction in an interactive system, such as a user gripping, lifting, or otherwise touching an object that is also or relates to an audio object for example.

Figure 5:
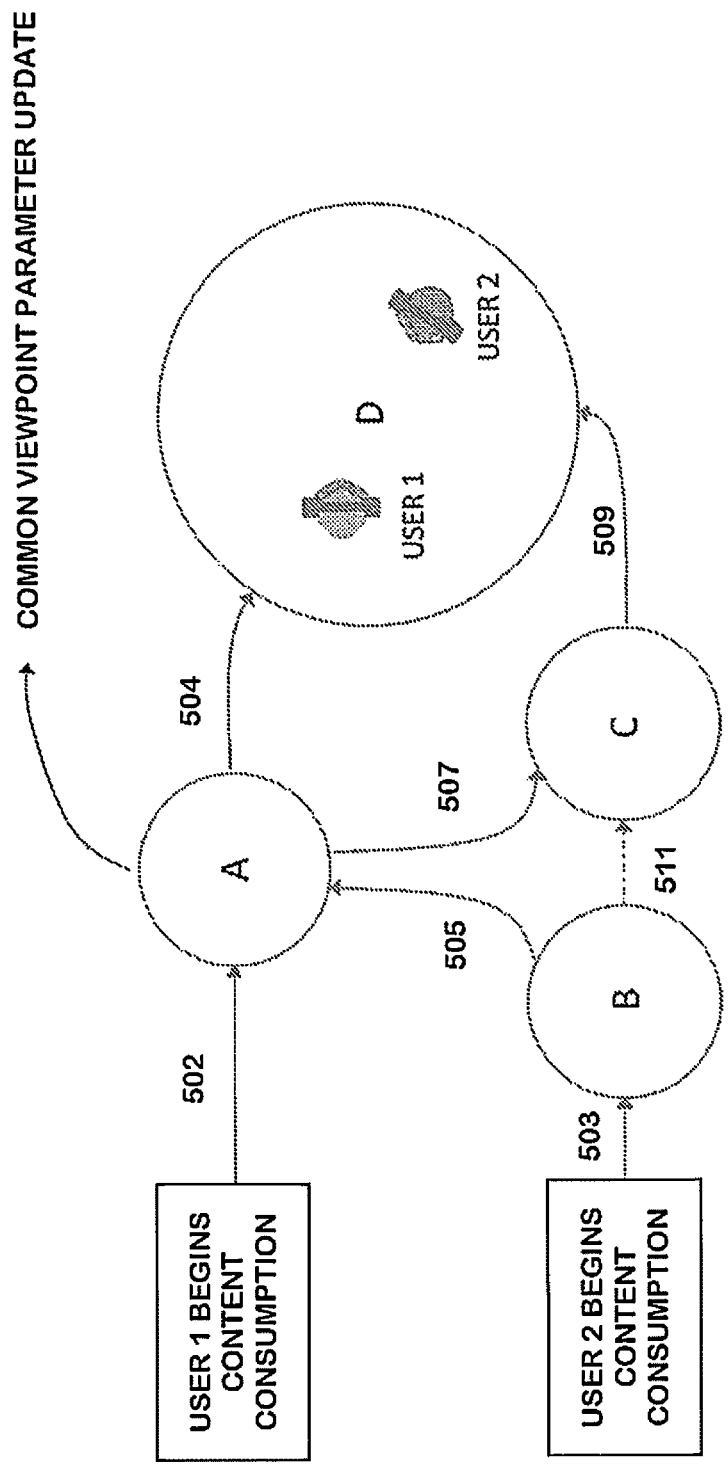
FIG. 5 represents a multi-viewpoint content space of an audio-visual experience file in accordance with some example embodiments.

Referring now to FIG. 5, this figure represents interactions between two users in a multi-viewpoint audio-visual 3DoF+ experience file. In the example shown in FIG. 5, it is assumed that each viewpoint comprises at least one set of audio sources. In addition, each viewpoint may feature, e.g., a separate background music that can relate to aspects and artistic intent of the viewpoint.

Furthermore, user 1 and user 2 may be connected to each other, e.g., via a low-delay communications codec interface. The users or their avatars may or may not be visible to each other. The users may or may not have further interactivity with each other (beyond the communications link). Although the example in FIG. 5 shows only two users, this is not intended to be limiting as the features described herein are applicable more than two users.

In FIG. 5, a first user ('user 1') launches an application to experience VR and opens the file. User 1 is presented with a first viewpoint A as shown by 502, which may be, for example, a default starting viewpoint for this content or selected by user 1. A second user ('user 2') similarly opens the file, connects to the first user 1, and selects 503 a first viewpoint B. Alternatively, of course, if viewpoint A is the default starting point, user 2 could also start at A. In this example, user 1 stays at viewpoint A for a longer time, whereas user 2 switches from viewpoint B to A as shown by 505, followed by a switch from A to C as shown by 507. Alternatively, user 2 may switch, e.g., from viewpoint B to C without seeing viewpoint A as shown by 511. Both users eventually switch to a common viewpoint D as shown by 504, 509.

As the four viewpoints of the multi-viewpoint 3DoF+ media file can be at the same time (for example, as part of a same storyline and individual points of view that progress the story/content with a different focus) it is understandable that the content creator may wish to treat two or more of the viewpoints as being: completely separate, connected/"mirrored", or in a dynamic manner. A dynamic manner may be in relation between, for example, viewpoints A and B may depend on a time instance of the overall presentation or a part of it or at least one user action. The user action may, e.g., relate to what the user has done in the content, the amount of time spent in a certain viewpoint, the order of viewpoint switching, and/or the like. From the user experience point of view, this gets more complicated when there are multiple users who can indicate (e.g., by discussing via a communications link) to each other something about a viewpoint that at least one of the users has not previously visited, seen, encountered, and/or the like. In these situations, the following options may be provided that offer varying degrees of specified content creator control, which are described with reference to FIG. 5:

Option 1: A simple switching implementation of a multi-viewpoint file may be provided where user 1 and user 2 consume the same content in viewpoint D. For this implementation, the experience does not take into account the previously consumed content by the users themselves nor the previously consumed content of the at least a second user. For this technique there is 1) a discontinuity of experience from the user's own previous experience, and 2) a discontinuity of experience with the at least one second user.

Option 2: According to another option each user can have modifications of their own user experience based on their own previous content consumption. Thus, for example, user 1 may continue to hear at least one audio from viewpoint A in viewpoint D in addition to or instead of at least one audio that is by default part of viewpoint D. Using this technique allows a continuous experience from the user's own previous experience, but there is still a discontinuity with the at least one second user.

Option 3: According to another technique, each user can have modification of their own user experience based on their own previous content consumption and the content consumption of at least one other user. Thus, user 1 may, for example, receive in viewpoint D at least one relevant audio from viewpoint C (where user 1 has not visited). This audio can furthermore relate to the user's own previous experience in viewpoint A. It is selected based on user 2 having switched to a common viewpoint D and having visited at least viewpoint C (thus making this viewpoint and its content relevant for the common experience). In some embodiments, the audio of viewpoint C relating to viewpoint A may require, e.g., for the at least two users having together consumed viewpoint A (i.e., a common viewpoint parameter update may have been carried out). This technique allows both continuity of experience from the user's own previous experience, and continuity of experience with the at least one second user. In some examples, this technique may be applied to a 6DoF continuous roaming case where the past content consumption of users interacting with each other may also differ.

Consider the following example for option 3, there are two characters, John and Jack, in a multi-viewpoint storyline that user 1 and user 2 view at least partially together. John and Jack meet in viewpoint B, which only user 2 has experiences. Subsequently John and Jack get into a heated argument in viewpoint A, which both user 1 and user 2 experience. Then, in viewpoint C, Jack formulates a plot to seek revenge on John during which menacing music is played in the background. User 1 does not visit or experience viewpoint C. Thus, if user 1 was consuming the content alone and visits viewpoint D, then user 1 may think there is something wrong with Jack but would not specifically know about the plot and may not hear the menacing music from viewpoint C at viewpoint D. On the other hand, user 2 visited viewpoint C and therefore knows about the Jack's plot. Further, some elements of the menacing music of viewpoint C may be used to modify the audio at viewpoint D for user 2. Option 3 above would also allow, for example, the audio for user 1 at viewpoint D to be modified in a similar way as the audio was modified for user 2, such as by including some of the same elements of the menacing music for example. This may cause the users, e.g., to talk about the change in the music making the content consumed together a more meaningful experience.

Combining Multiple Audio Renderings

Figure 6A:
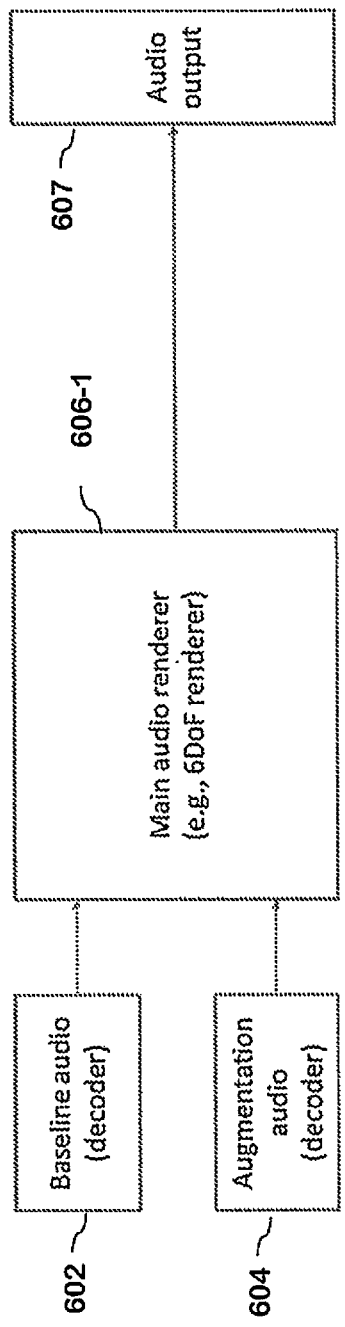
FIGS. 6A and 6B show different switching implementations of a multi-viewpoint file in accordance with some example embodiments.
Figure 6B:
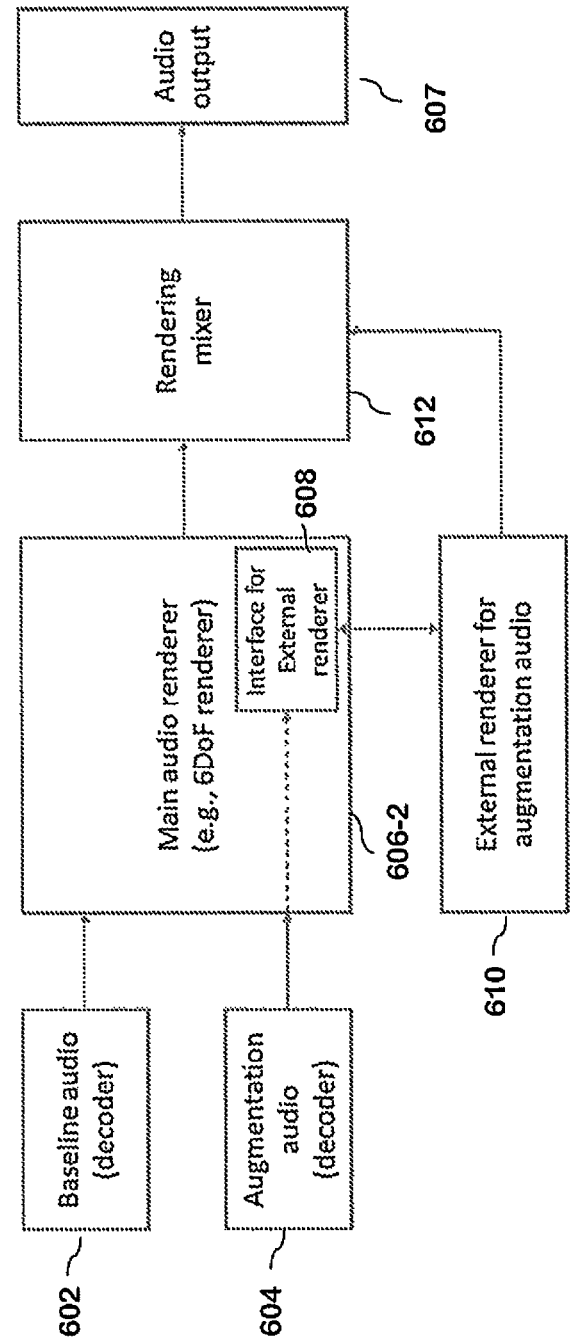

FIGS. 6A and 6B show example frameworks for augmenting audio in accordance with some example embodiments. The framework in FIG. 6A, shows a main (or baseline) audio stream from baseline audio decoder 602 for 6DoF media content or a multi-viewpoint immersive audio content. The main audio stream is augmented by an augmented audio stream from augmentation audio (decoder) 604 related to, e.g., an additional service. In the example in FIG. 6A the main audio renderer 606-1 supports the baseline and augmented audio streams. In this example, the main audio renderer 606-1 may be configured to carry out one or more of the operations as described herein. The rendering of the audio is passed to audio output 607.

FIG. 6B shows an example framework similar to FIG. 6A but also provides support for audio streams having formats that are not supported by main audio renderer 606-1. In this example, it is assumed the augmented audio stream from augmentation audio (decoder) 604 is not supported by the main audio renderer 606-2. The main audio renderer 606-2 includes an interface 608 that passes the unsupported audio stream to an external renderer 610. The audio rendering from the main audio renderer 606-2 and the audio rendering is passed to the rendering mixer 612 which mixes the audio and provides the mixed audio to audio output 607. Alternatively, the rendering mixer 612 may be implemented inside the main audio renderer 606-2. In this example, the main audio renderer 606-2 and the external renderer 610 may be configured to carry out one or more of the operations as described herein.

Relatedly, a common metadata could be used to control the rendering of the main audio (6DoF) based on the second audio (augmentation). However, it is noted that while the content creator has control of the first audio, there is generally limited or no control of the augmentation audio that can be, e.g., a user-generated content (such as a live mobile device capture), and therefore, in some examples, the full metadata of Table 1 may not exist that directly links the two audio streams. Thus, the metadata may also include general rules that can be applied based on a high-level audio type or role metadata, or rules that are only applied to augmentation audio where the role of the augmentation audio is not known. In further embodiments, a service may provide audio metadata for augmentation audio based on the multi-viewpoint audio being consumed by the recipient of the audio augmentation.

The process as described in FIG. 4, for example, applies also to these additional use cases relating to augmentation of the main audio, where step S50 may be skipped since the at least two users consume different content files and thus are generally never in the same viewpoint of a multi-viewpoint content.

FIG. 7 is a logic flow diagram for controlling audio in multi-viewpoint omnidirectional content. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the reality module 108-1 and/or 108-2 may include multiples ones of the blocks in FIG. 7, where each included block is an interconnected means for performing the function in the block. The blocks in FIG. 7 are assumed to be performed by the apparatus 100-1, e.g., under control of the reality module 108-1 and/or 108-2 at least in part.

According to an example embodiment (which may be referred to as example 1), a method is provided including receiving a spatial media content file comprising a plurality of viewpoints as indicated by block 700; determining a first viewpoint from the plurality of viewpoints for a first user consuming the spatial media content file as indicated by block 702; receiving an indication that affects an audio rendering of the first viewpoint for the first user, wherein the indication is associated with one or more actions of at least one second user consuming the spatial media content file as indicated by block 704; and controlling the audio rendering of the first viewpoint for the first user in response to the receiving the indication based on at least one of: a position and/or orientation of the first user, and the one or more actions of the second user as indicated by block 706.

An example of a further embodiment (which may be referred to as example 2), is a method as in example 1, wherein receiving the indication is based on one of: the first user entering the first viewpoint while the at least one second user is present at the first viewpoint; and the at least one second user entering the first viewpoint while the first user is present at the first viewpoint.

An example of a further embodiment (which may be referred to as example 3), is a method as in any one of examples 1-2, wherein the one or more actions of the at least one second user comprise at least one of presence of the at least one second user at one or more other viewpoints of the plurality of viewpoints prior to switching to the first viewpoint; an order that the at least one second user visited one or more other viewpoints of the plurality of viewpoints prior to switching to the first viewpoint; a time spent at one or more other viewpoints of the plurality of viewpoints prior to switching to the first viewpoint; a user interaction of the at least one second user with a virtual object and/or a virtual character in one or more of the plurality of viewpoints of the spatial media content file; and occurrence of one or more events in the spatial media content file perceived by the at least one second user at one or more of the plurality of viewpoints, wherein the one or more events were not perceived by the first user.

An example of a further embodiment (which may be referred to as example 4), is a method as in any one of examples 1-3, wherein controlling the audio rendering of the first viewpoint for the first user comprises: modifying a rendering of one or more first audio objects associated with the first viewpoint based on signaling associated with the one or more first audio objects.

An example of a further embodiment (which may be referred to as example 5), is a method as in any one of examples 1-4, wherein controlling the audio rendering of the first viewpoint for the first user comprises: rendering one or more second audio objects based on signaling associated with the one or more second audio objects, wherein the one or more second audio objects are associated with at least one or more other viewpoints previously visited by the at least one second user prior to switching to the first viewpoint.

An example of a further embodiment (which may be referred to as example 6), is a method as in any one of examples 4-5, wherein the signaling associated with the one or more of the first audio objects and/or the one or more second audio objects indicates one or more conditions relating to whether the audio object(s) associated with signaling is to be rendered, and how the audio object(s) associated with signaling is to be rendered.

An example of a further embodiment (which may be referred to as example 7), is a method as in any one of the examples 1-6, further comprising presenting the audio rendering to the first user.

An example embodiment (which may be referred to as example 8), is a method as in example 1, wherein the received indication is an indication of an event, where the event may be a disruption event.

In an example embodiment (which may be referred to as example 9), an apparatus is provided comprising: means for receiving a spatial media content file comprising a plurality of viewpoints; means for determining a first viewpoint from the plurality of viewpoints for a first user consuming the spatial media content file; means for receiving an indication that affects an audio rendering of the first viewpoint for the first user, wherein the indication is associated with one or more actions of at least one second user consuming the spatial media content file; and means for controlling the audio rendering of the first viewpoint for the first user in response to the receiving the indication based on at least one of: a position and/or orientation of the first user, and the one or more actions of the second user.

An example of a further embodiment (which may be referred to as example 10), is an apparatus as in example 9, further comprising means for performing a method as in any one of examples 2-8.

An example of a further embodiment (which may be referred to as example 11), is a computer readable medium comprising program instructions for causing an apparatus to perform at least the following: receiving a spatial media content file comprising a plurality of viewpoints; determining a first viewpoint from the plurality of viewpoints for a first user consuming the spatial media content file; receiving an indication that affects an audio rendering of the first viewpoint for the first user, wherein the indication is associated with one or more actions of at least one second user consuming the spatial media content file; and controlling the audio rendering of the first viewpoint for the first user in response to the receiving the indication based on at least one of: a position and/or orientation of the first user, and the one or more actions of the second user.

An example of a further embodiment (which may be referred to as example 12), is a computer readable medium as in example 11, wherein the program instructions further cause the apparatus to perform a method as in any one of examples 2-8.

In an example embodiment (which may be referred to as example 13), an apparatus is provided comprising: at least one processor; and at least one non-transitory memory including computer program code, the at least one memory and the computer program code configured to, with the at least one processor, cause the apparatus to perform operations, the operations comprising: receiving a spatial media content file comprising a plurality of viewpoints; determining a first viewpoint from the plurality of viewpoints for a first user consuming the spatial media content file; receiving an indication that affects an audio rendering of the first viewpoint for the first user, wherein the indication is associated with one or more actions of at least one second user consuming the spatial media content file; and controlling the audio rendering of the first viewpoint for the first user in response to the receiving the indication based on at least one of: a position and/or orientation of the first user, and the one or more actions of the second user.

An example of a further embodiment (which may be referred to as example 14), is an apparatus as in example 13, wherein the apparatus is further caused to perform a method as in any one of examples 2-8.

Without in any way limiting the scope, interpretation, or application of the claims appearing below, a technical effect of one or more of the example embodiments disclosed herein is allowing immersive content to be viewed by multiple users through a different set of viewpoint, and thus provide improved audio scene control of the multi-viewpoint media content/file rendering/presentation. This differs from traditional content, where two users only needed to be synchronized in time to have a common content consumption experience. Another technical effect of one or more of the example embodiments disclosed herein is providing the end user a more coherent and immersive user experience responding to personal usage scenarios by enabling smooth/ natural transitions within and between, for example, thematic passages that take into account both the content and the viewpoint selection by the user as well as the actions of other users. Another technical effect of one or more of the example embodiments disclosed herein is enabling one media file to enable, based on the novel metadata signaling and associated processing, different, personalized content experiences based on the disruptive events triggered by at least one of the multiple users in a shared content consumption. The personalized content experience may be, e.g., a user having the feeling that what they have previously seen and done directly relates to their current experience. A user can verify this by, e.g., consuming the content twice via a different path in time and/or space. An advanced personalized experience takes into account not only the presence and actions of a first user, but also those of at least a second user when common content consumption is experienced. This way, two users arriving to a common viewpoint may experience together more than they would simply by themselves. Another technical effect of one or more of the example embodiments disclosed herein is combining experiences in at least two media files used in such multi-user content consumption.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 104 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory storing instructions that, when executed with the at least one processor, cause the apparatus at least to:
receive a spatial media file comprising a plurality of viewpoints;
determine a viewpoint from the plurality of viewpoints for a user consuming the spatial media file;
receive an audio stream associated with the viewpoint;
receive an augmentation audio data, wherein the augmentation audio data is at least partially different from the audio stream, wherein a format of the augmentation audio data is at least partially different from a format of the audio stream, wherein the augmentation audio data comprises at least one of:
audio associated with a viewpoint different from the determined viewpoint,
audio associated with the user, or
audio associated with a remote second user;
control an audio rendering of the audio stream associated with the viewpoint based, at least partially, on metadata associated with the augmentation audio data; and
provide the audio rendering of the audio stream for mixing with a rendering of the augmentation audio data.

2. The apparatus of claim 1, wherein the at least one memory stores instructions that, when executed with the at least cause one processor, the apparatus to:
provide the augmentation audio data to an external renderer, wherein the external renderer is configured to generate the rendering of the augmentation audio data, wherein the external renderer supports the format of the augmentation audio data; and
receive the rendering of the augmentation audio data from the external renderer, wherein the received rendering of the augmentation audio data is provided for mixing with the audio rendering of the audio stream.

3. The apparatus of claim 1, wherein the at least one memory stores instructions that, when executed with the at least one processor, cause the apparatus to:
obtain further metadata for the augmentation audio data; and
control the audio rendering of the augmentation audio data based, at least partially, on the further metadata.

4. The apparatus of claim 3, wherein the further metadata is one of:
  metadata associated with a role of the augmentation audio data,
  metadata associated with the format of the augmentation audio data, or
  metadata, obtained from a service, that is associated with the augmentation audio data.

5. The apparatus of claim 1, wherein the audio stream comprises at least one of:
  six degrees of freedom media content, or
  multi-viewpoint immersive audio content.

6. The apparatus of claim 1, wherein the at least one memory stores instructions that, when executed with the at least one processor, cause the apparatus to:
  control the audio rendering of the audio stream further based on at least one of:
    a position of the user with respect to the determined viewpoint, or
    an orientation of the user with respect to the determined viewpoint.

7. A method comprising:
  receiving a spatial media file comprising a plurality of viewpoints;
  determining a viewpoint from the plurality of viewpoints for a user consuming the spatial media file;
  receiving an audio stream associated with the viewpoint;
  receiving an augmentation audio data, wherein the augmentation audio data is at least partially different from the audio stream, wherein a format of the augmentation audio data is at least partially different from a format of the audio stream, wherein the augmentation audio data comprises at least one of:
    audio associated with a viewpoint different from the determined viewpoint,
    audio associated with the user, or
    audio associated with a remote second user;
  controlling an audio rendering of the audio stream associated with the viewpoint based, at least partially, on metadata associated with the augmentation audio data; and
  providing the audio rendering of the audio stream for mixing with a rendering of the augmentation audio data.

8. The method of claim 7, further comprising:
  providing the augmentation audio data to an external renderer, wherein the external renderer is configured to generate the rendering of the augmentation audio data; and
  receiving the rendering of the augmentation audio data from the external renderer.

9. The method of claim 7, further comprising:
  obtaining further metadata for the augmentation audio data; and
  controlling the audio rendering of the augmentation audio data based, at least partially, on the further metadata.

10. The method of claim 9, wherein the further metadata is one of:
  metadata associated with a role of the augmentation audio data,
  metadata associated with the format of the augmentation audio data, or
  metadata, obtained from a service, that is associated with the augmentation audio data.

11. The method of claim 7, wherein the audio stream comprises at least one of:
  six degrees of freedom media content, or
  multi-viewpoint immersive audio content.

12. The method of claim 7, further comprising:
  controlling the audio rendering of the audio stream further based on at least one of:
    a position of the user with respect to the determined viewpoint, or
    an orientation of the user with respect to the determined viewpoint.

13. A non-transitory computer-readable medium comprising program instructions stored thereon for performing at least the following:
  causing receiving of a spatial media file comprising a plurality of viewpoints;
  determining a viewpoint from the plurality of viewpoints for a user consuming the spatial media file;
  causing receiving of an audio stream associated with the viewpoint;
  causing receiving of an augmentation audio data, wherein the augmentation audio data is at least partially different from the audio stream, wherein a format of the augmentation audio data is at least partially different from a format of the audio stream, wherein the augmentation audio data comprises at least one of:
    audio associated with a viewpoint different from the determined viewpoint,
    audio associated with the user, or
    audio associated with a remote second user;
  controlling an audio rendering of the audio stream associated with the viewpoint based, at least partially, on metadata associated with the augmentation audio data; and
  causing providing of the audio rendering of the audio stream for mixing with a rendering of the augmentation audio data.

14. The non-transitory computer-readable medium of claim 13, further comprising instructions stored thereon for performing:
  causing providing of the augmentation audio data to an external renderer, wherein the external renderer is configured to generate the rendering of the augmentation audio data; and
  causing receiving of the rendering of the augmentation audio data from the external renderer.

15. The non-transitory computer-readable medium of claim 13, further comprising instructions stored thereon for performing:
  obtaining further metadata for the augmentation audio data; and
  controlling the audio rendering of the augmentation audio data based, at least partially, on the further metadata.

16. The non-transitory computer-readable medium of claim 15, wherein the further metadata is one of:
  metadata associated with a role of the augmentation audio data,
  metadata associated with the format of the augmentation audio data, or
  metadata, obtained from a service, that is associated with the augmentation audio data.

17. The non-transitory computer-readable medium of claim 13, wherein the audio stream comprises at least one of:
  six degrees of freedom media content, or
  multi-viewpoint immersive audio content.

18. The non-transitory computer-readable medium of claim 13, further comprising instructions stored thereon for performing:
  controlling the audio rendering of the audio stream further based on at least one of:

a position of the user with respect to the determined viewpoint, or an orientation of the user with respect to the determined viewpoint.

* * * * *